United States Patent [19]

Kelsey et al.

[11] Patent Number: 4,858,887
[45] Date of Patent: Aug. 22, 1989

[54] VALVE AND VALVE ROLLER SEALING

[75] Inventors: Christopher G. Kelsey, Sydney; Ian R. McKenzie, Flinders Park, both of Australia

[73] Assignee: Geoflow International Pty. Limited, Australia

[21] Appl. No.: 249,678

[22] Filed: Sep. 27, 1988

[30] Foreign Application Priority Data

Oct. 23, 1987 [AU] Australia ................................. PI5029

[51] Int. Cl.$^4$ ............................................. F16K 13/02
[52] U.S. Cl. ..................................... 251/212; 251/209
[58] Field of Search ................ 251/208, 209, 212, 205

[56] References Cited

U.S. PATENT DOCUMENTS 1,170,046  1/1916  Carleton .......................... 251/212 X

FOREIGN PATENT DOCUMENTS 230085  11/1959  Australia .
2056027  3/1981  United Kingdom .

Primary Examiner—A. Michael Chambers
Assistant Examiner—John C. Fox
Attorney, Agent, or Firm—Stevens, Davis, Miller & Mosher

[57] ABSTRACT

A fluid control valve of the kind in which a pair of cylindrical rollers (26,27) are provided with complementary peripheral grooves (32) the cross-section of which is tapered so as to form an aperture the size of which is varied by rotation of the rollers. For sealing the rollers within a chamber formed by a valve liner (34,35) the cylinder peripheries are provided with oppositely inclined sealing teeth (43,44) and resilient sealing projections (43) which engage in the closed position of the valve. Complementary ramped formations (46,47) are provided on the lining and ends of the rollers.

5 Claims, 3 Drawing Sheets

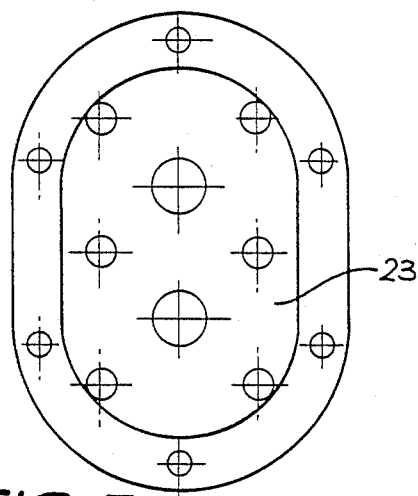
FIG.5
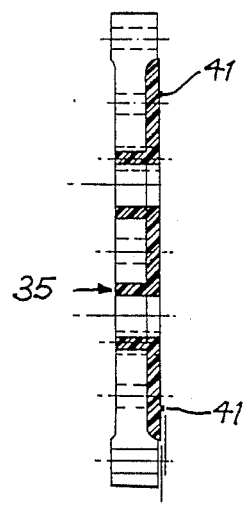
FIG.6
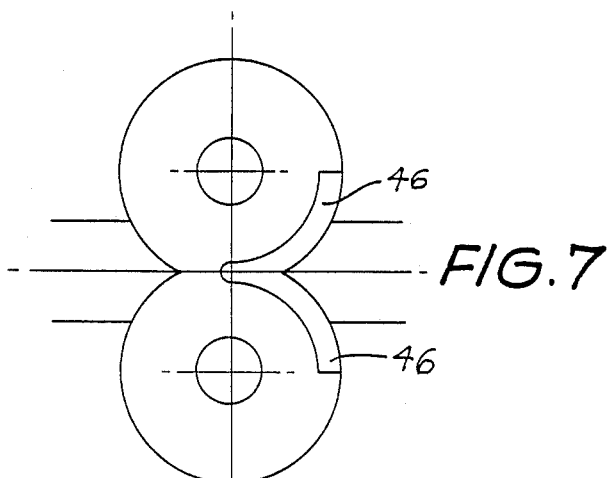
FIG.7
FIG.8
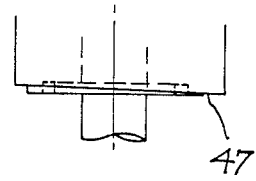
FIG.9

VALVE AND VALVE ROLLER SEALING

FIELD OF THE INVENTION

This invention relates to valves for the control of fluid flow, of the kind comprising cylindrical rollers the contacting surfaces of which are provided with complementary juxtaposed circumferentially disposed grooves of varying depth, so as to form a fluid flow aperture the size of which may be varied y rotation of the rollers.

BACKGROUND ART

Such a valve is described in United Kingdom patent specification No. 2,056,027.

An object of the present invention is to provide a valve of this type which provides more positively for sealing against leakage past the rollers when the valve is closed.

SUMMARY OF THE INVENTION

In one broad form the invention comprises a fluid valve in which flow is controlled by a pair of cylinders in peripheral contact and rotatable about parallel axes between a closed position and an open position of the valve, the cylinders being mounted within a valve chamber defined by upper, lower and cylindrical wall portions, at least one of the cylinders having a tapered circumferential groove in its peripheral face, characterised in that the peripheral face of each cylinder is provided with at least one pair of oppositely inclined teeth sealingly engageable with said cylindrical wall portion, the peripheral face being further provided with a resilient sealing projection engageable with the corresponding projection of the other cylinder when the cylinders are rotated to the closed position of the valve.

Preferably the end faces of each cylinder are provided with a ramped portion adjacent the edge of the respective face in the quadrant thereof extending rearwardly from said projection, considered in relation to the direction of closing the rotation of the cylinder, said upper and lower walls being provided with complementary arcuate ramp formations, said ramped portions and said ramp formations engaging upon closure of the valve.

BRIEF DESCRIPTION OF THE DRAWINGS

The features of the invention will now be described in relation to the accompanying drawings, which illustrate an embodiment of the invention. In the drawings :

FIG. 5 is a plan view of the gear cover plate of the valve illustrated in FIGS. 1 to 4;

FIG. 6 is a cross-section of the lining of the gear cover plate of FIG. 5;

FIG. 7 is a fragmentary plan view of the interior of the valve chamber;

FIG. 8 is a fragmentary sectional view of the base of the valve chamber; and

FIG. 9 is a fragmentary elevation of one end of a roller.

Figure 1:
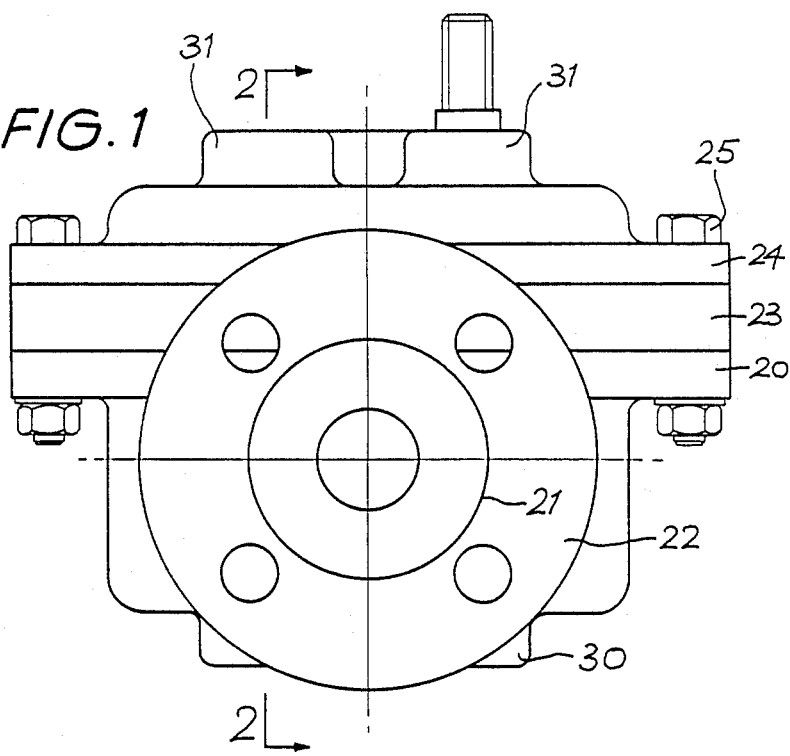
FIG. 1 shows in end elevation a valve embodying the invention.
Figure 2:
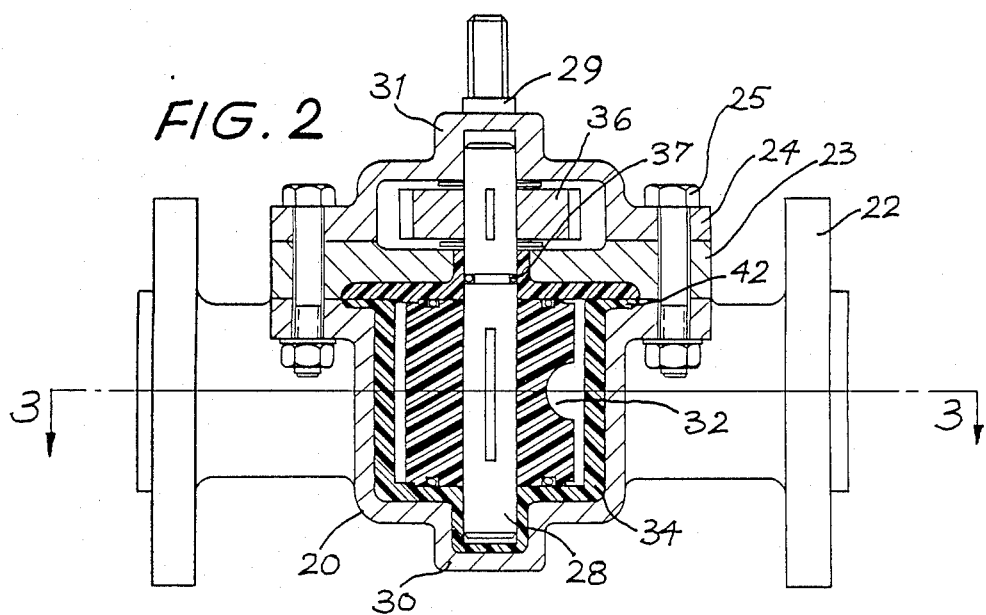
FIG. 2 is a section taken on the line 2—2 of FIG. 1.

The valve illustrated comprises a body 20 which provides fluid passages 21 and connecting flanges 22, a valve cover plate 23 and a gear cover plate 24, assembled together by bolts 25.

Mounted within a valve chamber formed in the body 20, as in the prior art referred to, are a pair of rollers 26 and 27 mounted on shafts 28 and 29 the ends of which are journalled in bearing regions 30 and 31 provided respectively in the body 20 and the gear cover plate 24. The shaft 29 of roller 27 passes through the gear cover plate 24 to enable its engagement by a handle or other operating mechanism (not shown).

Each of the rollers 26 and 27 is provided with a tapered semi-circular groove 32, these grooves opposing each other to provide the valve action described in the prior art referred to. Again as in the prior art, these rollers may be of polyurethane, and in this embodiment they are fixed to their shafts by means of keys 33.

The walls of the body 20 are provided with a polyurethane lining 34, and the valve chamber containing the rollers 26 and 27 is closed by the valve cover plate 23 which is also provided with a polyurethane lining 35, shown in more detail in FIG. 6. In the bearing regions 30 the lining 34 provides a bearing surface for the bottom of the shafts 28 and 29, while the lining 35 extends within apertures in the cover plate 23 to receive the shafts, in which area O-ring seals 37 are provided.

Between the valve cover plate 23 and the gear cover plate 24 identical gears 36 are fixed to the shafts 28 and 29, by means of keys 38.

0-rings 39 are provided in grooves 40 in the end faces of the rollers 26 and 27, and as shown in FIG. 6, the valve chamber is sealed by means of a circular rib 41 which is moulded integrally with the lining 35 of the valve cover plate 23, and which upon assembly is compressed against a peripheral flange 42 in the lining 34.

Preferably the linings 34 and 35 are cast into the body 20 and cover plate 23.

In prior art valves of this kind, the efficacy of sealing against leakage at closure has relied upon the seal achieved at the line of contact between the rollers, and the seal provided between the roller surfaces and the valve chamber lining.

Figure 3:
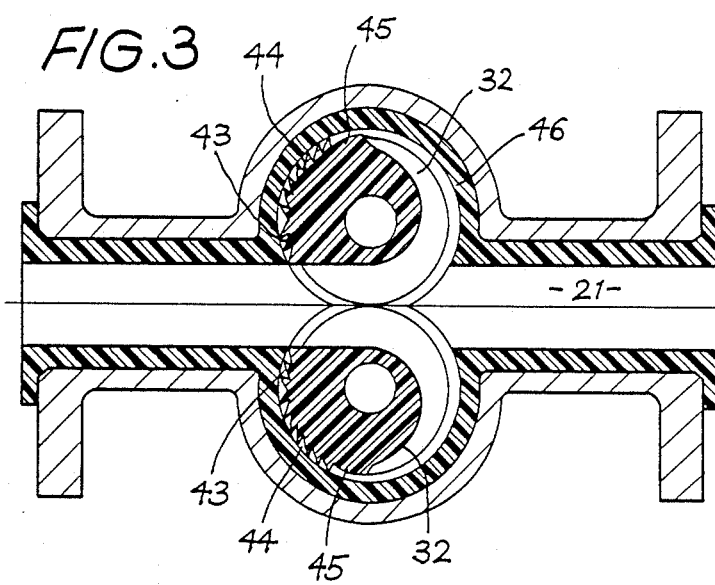
FIG. 3 is a section taken on the line 3—3 of FIG. 2 and showing the valve in the fully open position.

In high pressure applications, a more positive seal is desirable, and this embodiment of the invention incorporates features for this purpose. As shown in FIG. 3, the cylindrical surface of each of the rollers 26 and 27 comprises a 90° arc containing a series of sealing formations, consisting in this embodiment of a first group of teeth 43 which, in the fully open position of the rollers as shown in FIG. 3, are located adjacent the outlet portion of the fluid passage 21 and which are inclined towards that passage, a second group of oppositely inclined teeth 44 extending from the teeth 43, and a sealing mound 45 at the end of the 90° arc and therefore 90° opposite the axis of the valve in the fully open position.

Figure 4:
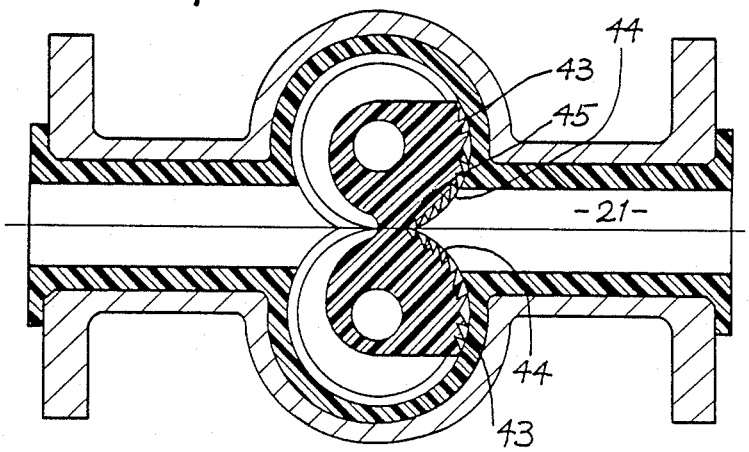
FIG. 4 is a section taken on the line 3—3 of FIG. 2 and showing the valve in the closed position.

The teeth 43 and 44 bear against the cylindrical walls 46 of the lining 34 in the valve chamber, and prevent the leakage of fluid in either direction between these walls and the rollers 26 and 27. The inclination of the teeth towards the respective passages assists the security of seal achieved under high inlet or outlet pressure. As shown in FIG. 3, the number of teeth in each group 43 and 44 may differ, in the case illustrated the group 44 being of such arcuate extent that upon closure of the valve as illustrated in FIG. 4, those closest to the sealing mounds 45 will enter the passage 21. The inclination of the teeth in group 44 enables their re-entry to the cylindrical walls 46.

In other forms of the invention, the sealing formations may comprise only one pair of oppositely inclined teeth located substantially in the position of the adjacent oppositely inclined teeth in the embodiment just described.

The sealing mounds 44 extend radially a greater distance from the axis of the roller shaft than the distance between that axis and the valve axis, so that in the closed position of the valve illustrated in FIG. 4 the sealing mounds 45 compress against each other, providing an extended compression seal which is superior to the rolling line contact employed in the prior art valve referred to.

Further security of sealing of the valve in the closed position is provided on the periphery of the end faces of the rollers, and will now be described with reference to FIGS. 7 to 9.

The linings 34 and 35 opposite each roller end face are provided with an arcuate ramp 46 in the quadrant adjacent the inlet end of the passage 21, this being the right hand passage as viewed in the drawings. The ramps 46 merge near the valve axis and rise to a maximum height at their inner ends just past the line joining the axes of the rollers 26 and 27.

As shown in FIG. 9, each face of the rollers 26 and 27 is provided at its periphery with an arcuate, angled sealing face 47 the slope of which complements that of ramps 46. As the rollers close from their position in FIG. 3 to their position in FIG. 4, the faces 47 ride up against the ramps 46 to provide a compressed seal, completing the sealing closure of the roller.

While the invention has been described in relation to one particular embodiment, it will be appreciated that many variations are possible in the manner in which the principles behind this embodiment may be realised in practice. The location and shape of the sealing formations on the rollers may, for example, be altered without departing from the scope of the invention.

We claim:

1. A fluid valve in which flow is controlled by a pair of cylinders in peripheral contact and rotatable about parallel axes between a closed position and an open position of the valve, the cylinders being mounted within a valve chamber defined by upper, lower and cylindrical wall portions, at least one of the cylinders having a tapered circumferential groove in its peripheral face, characterised in that the peripheral face of each cylinder is provided with at least one pair of oppositely inclined teeth sealingly engageable with said cylindrical wall portion, the peripheral face being further provided with a resilient sealing projection engageable with the corresponding projection of the other cylinder when the cylinders are rotated to the closed position of the valve.

2. A valve according to claim 1 further comprising an inlet passage and an outlet passage communicating with said chamber, wherein said teeth are arranged in a first group of successive teeth inclined towards the inlet passage and a second group of successive teeth inclined toward the outlet passage.

3. A valve according to claim 2 wherein there are more teeth in said first group than in said second group.

4. A valve according to claim 1 wherein the end faces of each cylinder are provided with a ramped portion adjacent the edge of the respective face in the quadrant thereof extending rearwardly from said projection, considered in relation to the direction of closing rotation of the cylinder, said upper and lower walls being provided with complementary arcuate ramp formations, said ramped portions and said ramp formations engaging upon closure of the valve.

5. A valve according to claim 4 wherein said ramp formations extend in an arc between the region of said upper and lower walls lying between said axes and the region of said upper and lower walls arcuately spaced by approximately 90° therefrom.

* * * * *